United States Patent [19]

Sjöquist

[11] 3,850,798

[45] Nov. 26, 1974

[54] METHOD FOR SEPARATING A POLYPEPTIDE FROM MICROORGANISMS

[76] Inventor: John Axel Sjöquist, Hassjevagen 12, Uppsala, Sweden

[22] Filed: Oct. 25, 1973

[21] Appl. No.: 409,561

[30] Foreign Application Priority Data
Nov. 6, 1972   Sweden............................ 14329/72
Feb. 8, 1973   Sweden............................. 7301778

[52] U.S. Cl.............................................. 210/31 C
[51] Int. Cl.............................................. B01d 15/08
[58] Field of Search................................. 210/31 C

[56] References Cited
UNITED STATES PATENTS

| | | | |
|---|---|---|---|
| 3,476,737 | 11/1969 | Emneus et al. ...................... | 210/31 C |
| 3,502,545 | 3/1970 | Westman et al. .................. | 210/31 C |
| 3,686,118 | 8/1972 | Benson............................... | 210/31 C |
| 3,706,661 | 12/1972 | Tangen et al. ..................... | 210/31 C |

*Primary Examiner*—John Adee
*Attorney, Agent, or Firm*—Fred Philpitt

[57] ABSTRACT

A method for separating a polypeptide from microorganisms, said polypeptide having the ability of binding at least one immunoglobulin at the Fc-part of the latter, from a liquid containing the polypeptide in a mixture with substances of an impurifyring nature is disclosed, in which method the liquid containing said polypeptide is contacted with a solid phase consisting of or containing a polymeric substance which is insoluble in said liquid and which has at least one immunoglobulin or its Fc-fragment bound thereto, the Fc-part of said immunoglobulin or the Fc-fragment thereof being able to bind the polypeptide so that said polypeptide is bound to the Fc-part of the immunoglobulin or to the Fc-fragment thereof but not the substances of the impurifying character, whereupon the liquid with remaining impurities is separated from the solid phase and bound polypeptide is optionally also separated from said solid phase.

7 Claims, No Drawings

METHOD FOR SEPARATING A POLYPEPTIDE FROM MICROORGANISMS

The present invention relates to a method for separating a polypeptide from microorganisms, said polypeptide having the ability of binding at least one immunoglobulin at the Fc-part of the latter, from a liquid containing the polypeptide in mixture with substances of a contaminating nature.

The invention is mainly characterized in that the liquid containing said polypeptide is contacted with a solid phase consisting of or containing a polymeric substance which is insoluble in said liquid and which has at least one immunoglobulin or its Fc-fragment bound thereto, the Fc-part of the immunoglobulin or the Fc-fragment being able to bind the polypeptide so that said polypeptide is bound to the Fc-part of said immunoglobulin or to the Fc-fragment but not the contaminating substances, whereupon the liquid with the remaining contaminants is separated from the solid phase and the bound polypeptide is optionally also separated from said solid phase.

The term "polypeptide" as used here and in the claims also embraces proteins, which as known are polypeptides, and the polypeptide may contain carbohydrate units.

The method of the present invention distinguishes from known methods used for the same purpose in that it avoids complicated multistage operations using, inter alia, ion exchange chromatography etc. By means of the new method, the polypeptide in question is obtained in surprisingly pure form in a very simple manner under convenient conditions and with a high yield. The polypeptide in question is extremely valuable since it is able to bind immunoglobulins specifically and reversibly and because the bond is effected at the Fc-part of the immunoglobulin.

The immunoglobulin in question can derive from different animal species, primarily vertebrates, preferably mammals. As is known, immunoglobulins may belong to different immunoglobulin classes, such as class A (IgA), D (IgD), E (IgE), G (IgG) and M (IgM). One valuable aspect of the invention is that it can be applied in connection with polypeptides capable of binding themselves to immunoglobulins belonging to the IgG class, since this class, inter alia, quantitatively dominates among the immunoglobulins. The Fc-part of immunoglobulins can be split off therefrom by known enzymatic methods, whereby free Fc-fragments are obtained. The Fc-part of a specific immunoglobulin is often structurally similar in different animal species. Since, for example, polypeptide from S. aureus reacts with the Fc-part of IgG, the method of the present invention often enables IgG from different animal species to replace one another.

According to the invention, the polypeptide from microorganisms may be the so-called protein A from Staphylococcus aureus or fragments of said protein, said fragments being of a polypeptide nature and having the ability of binding at least one immunoglobulin at the Fc-part of the latter. Said polypeptides (protein A and fragments) deriving from S. aureus can bind immunoglobulins belonging to the IgG-class at their Fc-parts. Other examples are polypeptides from Staphylococcus epidermidis and from other bacteria strains.

In accordance with the invention, there should be used when practising the method a polymeric substance insoluble in the liquid, whereby the polymeric substance has at least one immunoglobulin or its Fc-fragment bound thereto. The immunoglobulin or its Fc-fragment can thus not be dissolved out of the solid phase or removed therefrom during washing operations. Preferably, the immunoglobulin or its Fc-fragment is bound to the polymeric substance by means of bonds of a covalent nature. Thus, the immunoglobulin molecules or their Fc-fragments may be bound to the insoluble polymer by means of bridges having bonds of a covalent nature.

The immunoglobulin or its Fc-fragment can be bound to the polymer by means of methods conventionally used when binding polypeptides, e.g., proteins, to polymeric substances, e.g. by means of cyanogen halide, isocyanates etc. The insoluble polymeric substances used may be such as are generally available for similar purposes, i.e., polymers with functional groups which can be used when binding proteins to polymers. Examples of such functional groups are hydroxyl groups, mercapto groups, primary and secondary amino groups, carbonyl groups, hydrazide groups, diazo groups and carboxyl groups. These groups can be used when forming bridges by conventional methods from the polymer to a protein, which in this case is the immunoglobulin or its Fc-fragment. The polymer, which is insoluble in the liquid used, may, however, swell in said liquid. For example, it may swell in water when an aqueous liquid is used. The polymer may consist of a three-dimensional network obtained, for example, by cross-linking a polymer such as a polysaccharide. Thus, very different polymers can be used. Cellulose, agarose, polyaminostyrene, cross-linked polymers (for example cross-linked polysaccharides), e.g., dextran cross-linked with epichlorohydrin (Sephadex(R)) or with diepoxides (for example with 1,4-butanediol diglycide ether) or starch or cellulose derivatives or polyvinyl alcohol cross-linked with epichlorohydrin or diepoxides are a few examples of such polymers. Other examples are insoluble polymers obtained by reacting tetraethylenepentamine or hexamethylenediamine with epichlorohydrin or diepoxides. Another example is cross-linked polyacrylamide polymer substituted by p-aminophenyl groups (Enzacryl(R)).

The solid phase may exist in different forms. In many instances it may be suitable to use the polymeric substance in particulate form. Other examples include a polymeric test tube wall to which is bound an immunoglobulin or its Fc-fragment, e.g., IgG or its Fc-fragment.

The substances of an impurifying nature from which the relevant polypeptide is separated by the method may be of widely differing character. Thus, they may be other polypeptides (e.g., proteins), polysaccharides, nucleic acids or low molecular weight substances from the microorganisms from which the relevant polypeptide was produced.

As before mentioned, the method of the present invention is carried out in the presence of a liquid. The liquid used is primarily an aqueous liquid, e.g., an aqueous buffered NaCl solution having a suitable pH, e.g., in the proximity of the neutral point.

The relevant polypeptide from microorganisms bound to the solid phase in accordance with the invention may readily be reliberated from the solid phase under mild conditions, e.g., by changing the pH or ion strength.

EXAMPLE 1

A. Preparing raw extract of protein A from Staphylococcus aureus

S. aureus, strain Cowan I, cultured in accordance with the recommendations given in European J. Biochem, Vol. 29, (1972), page 572 (Sjöquist et al).

Protein A was released from the bacteria by means of the enzyme preparation lysostaphin. Insoluble material was removed by centrifugation and the liquid phase was recovered. The pH was adjusted to 3.5 with HCl and insoluble material was removed by centrifugation and the liquid recovered. The pH was then adjusted to 7.0 by means of NaOH in accordance with the aforementioned reference. The liquid obtained represents a raw extract containing protein A in mixture with substances of an impurifying nature.

B. Preparing agarose with IgG bound thereto

Agarose in the form of a commercially available Sepharose(R) 4 B (Pharmacia Fine Chemicals AB, Uppsala, Sweden) was used in the test.

The agarose was used in the form of minute particles (40 - 190 µ) swollen in water. The particle mass contained 4 percent by weight of agarose. The particle mass was first washed with water. 100 ml of packed particle mass added with 50 ml water were admixed with 10 g of cyanogen bromide in 50 ml of water whilst stirring at 20°C, the pH being maintained at 10 to 11 by adding 5 normal NaOH. After 10 minutes the particle mass was carefully washed with ice cold water and then with a 0.2 M sodium carbonate-sodium hydrogen carbonate buffer in water at pH 9.0 at 4°C.

The cyanogen bromide activated particle mass was slurried in 120 ml of the afore mentioned buffer at pH 9.0 containing 3.0 g human IgG (obtained from Kabi AB, Stockholm, Sweden) at 4°C whilst stirring.

After 4 hours the particle mass was removed by filtration and washed with the aforementioned buffer at pH 9.0 and the particle mass was then suspended in 1.5 liters of an aqueous solution containing 0.05 M 2-aminoethanol and 0.2 M sodium carbonate-sodium hydrogen carbonate at pH 9.0 and stirred at 4°C during 18 hours. The particle mass was then washed with a 0.1 M sodium phosphate buffer in water containing 4 M urea having pH 6.0 and then with a 0.1 M sodium phosphate buffer in water having pH 7.0 until the OD 280 nm of the washing liquid was less than 0.01. The gel mass was then washed with a 0.1 M glycine-HCl buffer in water at pH 3.0 and then again with the aforementioned 0.1 M sodium phosphate buffer having pH 7.0. The obtained product contained approximately 30 mg of bound IgG per 1 ml of packed particle mass.

C. Separation of protein A from raw extract from S. aureus

A chromatography column was filled with 100 ml of the packed particle mass having IgG bound thereto with pH 7.0 from sequence B above. 500 ml of the raw extract having pH 7.0 containing protein A from sequence A above was passed slowly through the column with the particle mass at 20°C, the through-flow speed being adjusted to 50 ml per hour. The particle mass was then carefully washed in the column with 0.1 M sodium phosphate buffer in water having pH 7.0 until the OD 280 nm of the washing liquid was less than 0.02. The obtained product contained approximately 3 mg of bound protein A per 1 ml of packed particle mass.

D. Separation of protein A from the particle mass

Protein A bound to the particle mass from sequence C above was released therefrom by eluting the column with 100 ml of 0.1 M glycine-HCl buffer in water at pH 3.0. The collected glycine-HCl buffer containing protein A was dialysed against distilled water, whereafter, protein A was obtained in solid form by freeze drying. Approximately 250 mg of protein A was obtained in pure form. (Alternatively instead of dialysis, desalting can be effected by means of gel filtration.) It could be shown by immunological tests that protein A was free from the substances having an impurifying nature.

EXAMPLE 2

A. Preparation of raw extract of polypeptide fragments of protein A from Staphylococcus aureus S. aureus, strain Cowan I, were cultured in accordance with recommendations given in European J. Biochem. vol. 29 (1972), page 572 (Sjöquist et al).

The bacteria were separated by centrifugation and washed with 0.9 per cent NaCl solution in water. 100 g of bacteria (wet weight) were slurried in 150 ml of a physiological common salt solution. 10 mg of trypsin (free from chymotrypsin) were added to said solution. The pH was 7.2. The enzyme treatment was carried out at 30°C at pH 7.2 for 30 minutes, whereafter 20 mg of a trypsin-inhibitor from soya beans were added. The suspension was then centrifuged. The supernatant liquid was recovered and sterile filtered through Millipore-filters.

The sterile filtered liquid contained fragments of protein A of polypeptide character in mixture with substances of an impurifying nature. For the purpose of purifying the fragments capable of binding themselves to the Fc-part of IgG-molecules, they were separated with the assistance of agarose having IgG bound thereto.

B. Preparation of agarose having IgG bound thereto

Human IgG was bound to agarose as described in Example 1, part B, above.

C. Separation of polypeptide fragments of protein A from S. aureus

A chromatographic column was filled with 100 ml of the packed particle mass having IgG bound thereto and pH 7.0 from sequence B above. 100 ml of the raw extract of pH 7.0 containing polypeptide fragments from protein A from sequence A above were passed slowly through the column with the particle mass at 20°C, the throughflow rate being adjusted to 50 ml per hour. The particle mass was then washed in the column carefully with 0.1 M sodium phosphate buffer in water at pH 7.0 until the OD 280 nm of the washing liquid was less than 0.02. The obtained product contained approximately 1 mg of bound polypeptides per 1 ml of packed particle mass.

D. Separating polypeptide fragments of protein A from particle mass

The polypeptides bound to the particle mass from sequence C above were released from the particle mass by elution of the column with 100 ml of 0.1 M glycine-HCl buffer in water at pH 3.0. The collected glycine-HCl buffer containing polypeptides which can bind the Fc-part of IgG-molecules was desalted by gel filtration using Sephadex G 25(R) (particles of dextran cross-linked with epichlorohydria). Approximately 100 mg of polypeptide having a molecular weight of approximately 7,000 were isolated by freeze drying. It could be shown by chromatography that the polypeptide fraction contained several closely related polypeptides, all having the said property of being able to bind the Fc-parts of IgG-molecules. By, inter alia, immunological tests it could be shown that the polypeptide fraction was free from substances of an impurifying character.

In a corresponding manner polypeptide fragments capable of binding the Fc-part of IgG-molecules can be isolated by first isolating protein A and then treating protein A in solution at, for example, pH 8.2 with trypsin in a manner analogous with that described above, whereafter the polypeptide fragments with the relevant properties are separated corresponding to that disclosed above in the example by binding to agarose with IgG bound thereto and then separating the polypeptide fragments.

In a similar was as in the above examples insoluble particles of dextran cross-linked with epichlorohydrin (Sephadex$^{(R)}$) and cellulose were used instead of agarose giving similar results.

What I claim is:

1. A method for separating a polypeptide from microorganisms, said polypeptide having the ability of binding at least one immunoglobulin at the Fc-part of the latter, from a liquid containing the polypeptide in a mixture with substances of an impurifying nature, characterized in that the liquid containing said polypeptide is contacted with a solid phase consisting of or containing a polymeric substance which is insoluble in said liquid and which has at least one immunoglobulin or its Fc-fragment bound thereto, the Fc-part of said immunoglobulin or the Fc-fragment thereof being able to bind the polypeptide so that said polypeptide is bound to the Fc-part of the immunoglobulin or to the Fc-fragment thereof but not the substances of the impurifying character, whereupon the liquid with remaining impurities is separated from the solid phase and bound polypeptide is optionally also separated from said solid phase.

2. A method according to claim 1, wherein the immunoglobulin or its Fc-fragment derives from vertebrates, preferably mammals.

3. A method according to claim 1, wherein the immunoglobulin or its Fc-fragment is an immunoglobulin from the IgG-class or derives from at least one such immunoglobulin.

4. A method according to claim 1, wherein the polypeptide from microorganisms is obtained from Staphylococcus aureus.

5. A method according to claim 4, wherein the polypeptide from microorganisms obtained from Staphylococcus aureus is the so-called protein A.

6. A method according to claim 1, wherein the immunoglobulin or its Fc-fragment is bound to the polymeric substance insoluble in said liquid, by means of bonds of a covalent nature.

7. A method according to claim 1, wherein the polymeric substance is in particulate form.

* * * * *

REEXAMINATION CERTIFICATE (507th)
United States Patent [19]
Sjöquist

[11] B1 3,850,798

[45] Certificate Issued  May 20, 1986

[54] METHOD FOR SEPARATING A POLYPEPTIDE FROM MICROORGANISMS

[76] Inventor: John A. Sjöquist, Hassjevagen 12, Uppsala, Sweden

Reexamination Request:
  No. 90/000,549, May 2, 1984

Reexamination Certificate for:
  Patent No.: 3,850,798
  Issued: Nov. 26, 1974
  Appl. No.: 409,561
  Filed: Oct. 25, 1973

[30] Foreign Application Priority Data
  Nov. 6, 1972 [SE]  Sweden ........................... 14329/72
  Feb. 8, 1973 [SE]  Sweden ............................ 7301778

[51] Int. Cl.$^4$ .................... C07K 3/18; C07K 3/20; C07K 3/28; B01D 15/08
[52] U.S. Cl. ................... 260/112 R; 260/112 B; 424/85; 424/88; 435/7; 435/180
[58] Field of Search ................ 260/112 R, 112 B; 424/85, 88; 435/7, 180

[56] References Cited

U.S. PATENT DOCUMENTS

| | | | |
|---|---|---|---|
| 3,555,143 | 1/1971 | Axen et al. | 260/112 B X |
| 3,645,852 | 2/1972 | Axen et al. | 260/112 R X |
| 3,788,948 | 1/1974 | Kagedal et al. | 260/112 R X |
| 3,847,745 | 11/1974 | Axen et al. | 260/112 R X |
| 3,995,018 | 11/1976 | Sjoquist | 260/112 R X |

OTHER PUBLICATIONS

Acta Pathol. Microbiol. Scand. 44(1958), 421–8, Jensen.
J. Exp. Med. 71(1940), 635–644, Verwey.
Acta Pathol. Microbiol. Scan 56(1962), 295–304, Lofquist, et al.
Int. Arch. Allergy, 23(1963) 289–305, Lofquist et al.
J. Immunol. 91(1963), 777–782, Yoshida et al.
Acta Pathol. Microbiol. Scand. 73(1968) 400–406, Grov.
European J. Biochem. 29, 572–578(1972) Sjoquist et al.
European J. Biochem. 29, 579–584 (1972), Björk et al.
Febs Letters, Nov. 1972, vol. 28, No. 1, Hjelm et al., pp. 73–76.
Journal of Immunology, 104, No. 2 (1970) Kronvall et al., pp. 273–278.
"'Protein A' from *S. aureus*," Forsgren, A. and Sjoquist, John (1966), *The Journ. of Immun.* 97, 822–827.
"Protein A from Staphylococcus aureus," Sjoquist, J. and Stalenheim, G., (1969), *The Journ. of Immun.* 103, 467–473.
"Water–Insoluble Derivatives of Enzymes, Antigens, and Antibodies," Silman, I. and Katchalski, E. (1966) *Ann. Rev. of Biochem.* 873–908.
"Immunologic Adsorbents", Campbell, D. et al. (1951) *Proc. N.A.S.* 37, 575–578.
"The Use of Affinity Chromatography for the Specific Purification of Antibodies and Antigens," Wofsy, L. and Burr, B. (1969) *The Journ. of Immun.* 103, 380–382.
"Protein A from *Staphylococcus aureus*," Forsgren, A. and Sjoquist, J. (1969) *Acta Path. Microbiol. Scandinav.* 75, 466–480.
"Studies on Antigen Preparations from *Staphylococcus aureus*," Grov. A. (1968) *Acta Path. Microbiol. Scandinav.* 73, 400–406.

*Primary Examiner*—Howard E. Schain

[57] ABSTRACT

A method for separating a polypeptide from microorganisms, said polypeptide having the ability of binding at least one immunoglobulin at the Fc-part of the latter, from a liquid containing the polypeptide in a mixture with substances of an impurifyring nature is disclosed, in which method the liquid containing said polypeptide is contacted with a solid phase consisting of or containing a polymeric substance which is insoluble in said liquid and which has at least one immunoglobulin or its Fc-fragment bound thereto, the Fc-part of said immunoglobulin or the Fc-fragment thereof being able to bind the polypeptide so that said polypeptide is bound to the Fc-part of the immunoglobulin or to the Fc-fragment thereof but not the substances of the impurifying character, whereupon the liquid with remaining impurities is separated from the solid phase and bound polypeptide is optionally also separated from said solid phase.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-7 is confirmed.

* * * * *